Oct. 31, 1950  V. C. MILLER  2,527,836
THERMOSTATIC MIXING VALVE
Filed May 10, 1946  2 Sheets-Sheet 1

INVENTOR.
VERE C. MILLER
BY
Reynolds & Beach
ATTORNEYS

Oct. 31, 1950 V. C. MILLER 2,527,836
THERMOSTATIC MIXING VALVE
Filed May 10, 1946 2 Sheets-Sheet 2
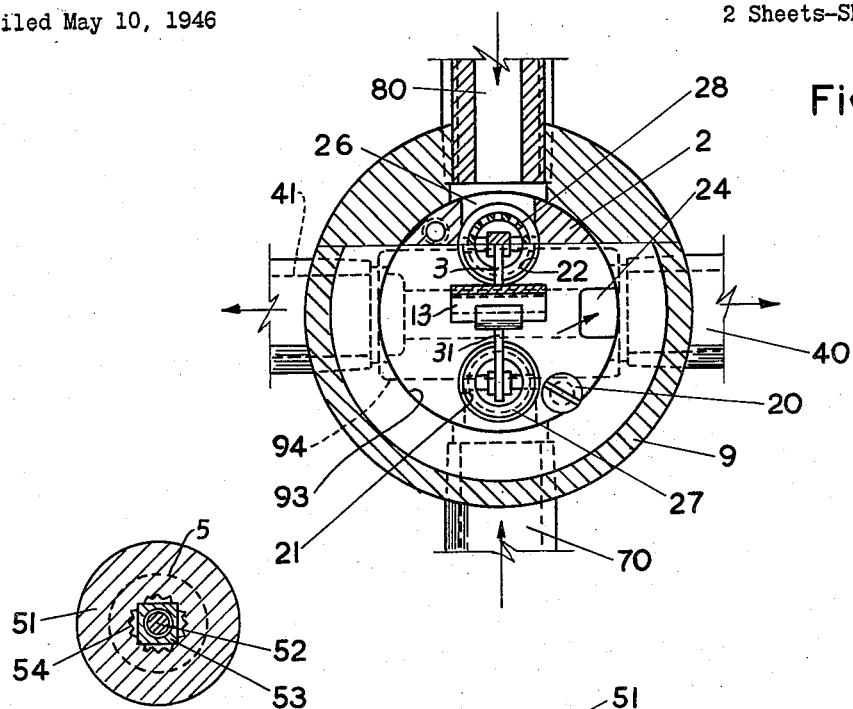
Fig. 2
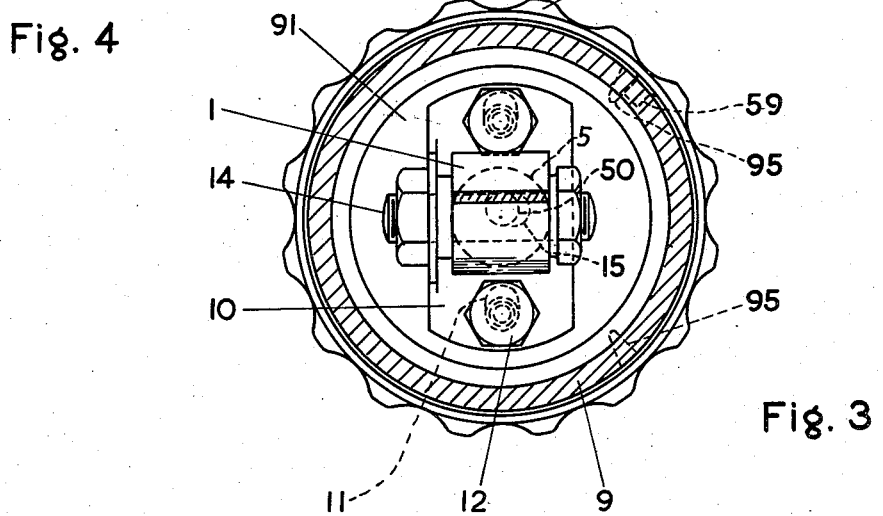
Fig. 4
Fig. 3
INVENTOR.
VERE C. MILLER
BY
Reynolds+Beach
ATTORNEYS Patented Oct. 31, 1950

2,527,836

UNITED STATES PATENT OFFICE 2,527,836

THERMOSTATIC MIXING VALVE

Vere C. Miller, Renton, Wash.

Application May 10, 1946, Serial No. 668,841

8 Claims. (Cl. 236—12)

Thermostatic valves for the maintenance of a desired mean temperature as between liquids at different temperatures—as hot and cold water—admitted to a mixing chamber, especially such as employ bimetal thermostatic elements, have been heretofore complicated, expensive, and difficult to manufacture and assemble. Often they have required mechanism for magnification of their effect, and of their power, in order to produce the necessary movement of controlling valves. They are preferred by many, however, to valves employing thermostatically expansible bellows, particularly because of their dependability, arising largely out of their freedom from influence by changing pressure conditions.

The primary object of the present invention is to provide a thermostatic mixing valve, of the type employing a bimetal element, which shall be of simple construction, appreciably less expensive than other similar valves, and which in particular will be easy to assemble.

In particular it is an object of the invention to reduce materially the number of parts, and consequently the complications of assembly and adjustment, without detracting from the accuracy of control, and the dependability, of the valve.

A further object of the present invention is to provide a valve assembly and arrangement for the control of the hot and cold water inlets, respectively, which by employing two valves is appreciably simpler to manufacture and assemble, and to finish accurately.

In all such thermostatic mixing valves it is desirable to provide means for changing the predetermined or mean temperature to be maintained automatically by the valve, within a reasonable range, and it is an object of the present invention to provide mechanism to this end which is simple in construction, and which does not complicate assembly problems, and which in addition permits simple and ready adjustment exteriorly of the valve, when adjustment is required.

It is also an object to provide a valve of the general nature indicated, which can be inset into a wall, and, if desired, tiled over, and in which nevertheless the several parts are readily accessible for installation, inspection, adjustment, or replacement.

With these objects in mind, and others as will appear as the specification progresses, my invention comprises the novel valve, and the novel combination and arrangement of the parts thereof, as shown in the accompanying drawings, described in this specification, and as will be more particularly pointed out in the claims.

In the accompanying drawings the invention has been shown in a present commercial form embodying the principles of my invention.

Figure 2 is a transverse section substantially along the line 2—2 of Figure 1, and Figure 3 is a similar section substantially along the line 3—3 of Figure 1.

Figure 4 is a detail section, as indicated at 4—4 in Figure 1.

Figure 1:
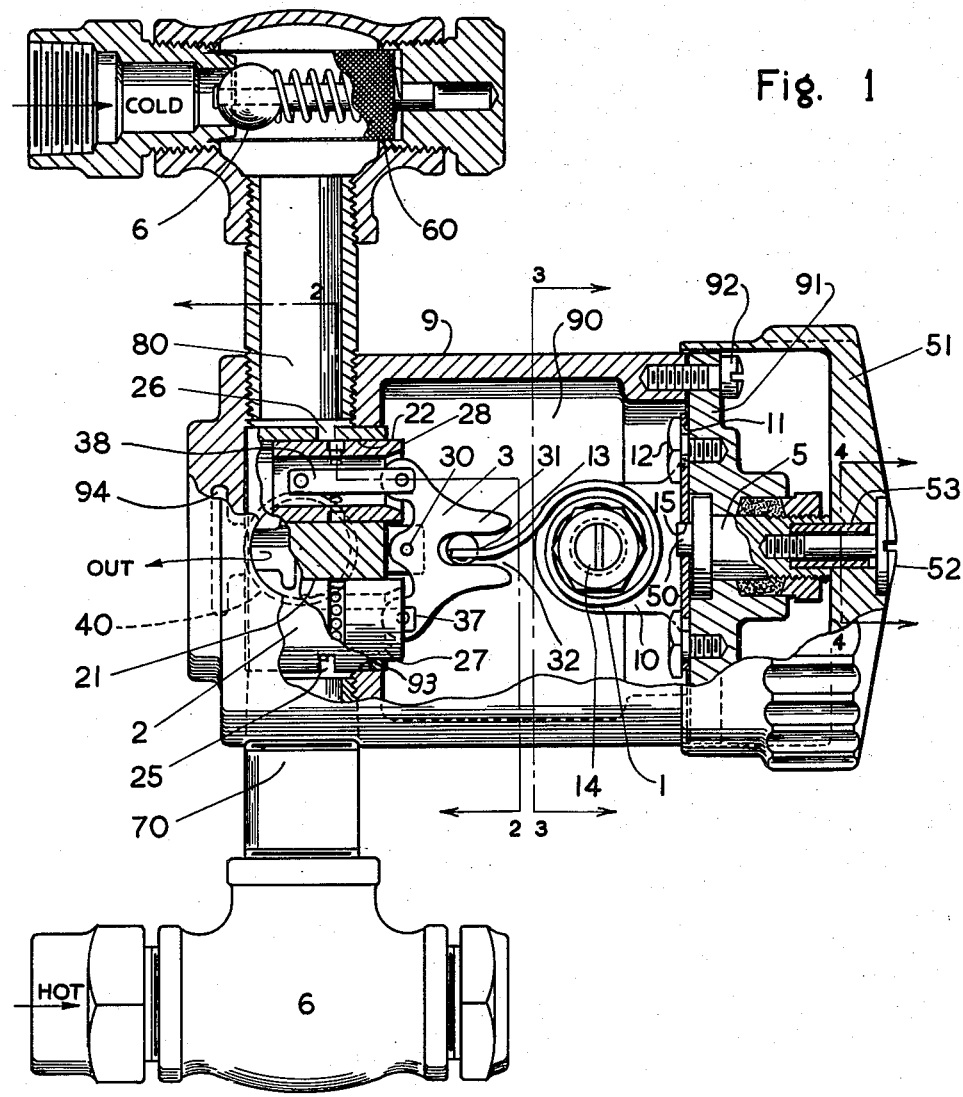
Figure 1 is in part an elevation and in part an axial section through the valve and associated fittings.

The valve is housed within a casing 9, which may be generally cylindrical, and which defines a mixing chamber 90. The casing is closed at its inner end, to which end lead the separate cold water and hot water inlets 80 and 70, respectively, and from which leads an outlet 40. The open outer end of the casing 9 is closed by a cover 91, secured by screws 92.

In order that the valve mechanism may readily be removed for cleaning, inspection, or repairs, it is preferred that the inner end of the casing 9 be formed as a reduced bore 93, within which is snugly received a body 2, having parallel longitudinally disposed bores 21 and 22 for the reception of valves 27 and 28, governing admission from the respective inlets 70 and 80. The valves 27 and 28 are shown as sleeve valves, suitably ported to cooperate with corresponding ports 25 and 26 in the body 2 which communicates with the respective inlets 70 and 80. The body 2 is secured within the casing by the screws 20, and can be removed simply by removal of these screws, and axially outward movement, carrying with it the valves 27 and 28.

The body 2 has also a port 24 for communication between the mixing chamber 90 and the outlet 40. There may be, in the casing 90, a cross passage 94, by which communication may be had from the port 24 to a second outlet 41. Thus the mixing valve may deliver alternatively to a tub or to a shower, and separate cut-off valves in the lines 40 and 41 will control the one to which delivery is to be made.

The two valves 27 and 28 are connected for conjoint but opposite movement by a lever 3 fulcrumed on the body 2 and between its ends, at 30. One arm of the lever is connected to the valve 28 by a link 38, and its other arm is similarly connected to the valve 27 by the link 37. As the lever tilts in one sense, the valve 28 may be drawn outwardly to reduce the opening of the admission port 26 for cold water, and the valve 27 will be moved inwardly to increase the opening of the admission port 27 for the hot water, or vice versa.

In addition to the arms which are thus connected to the respective valves 27 and 28 the lever 3 has a third arm 31, which is slotted lengthwise of the casing 9, as indicated at 32. Received within the slot 32 is the inwardly projecting end 13 of a large, relatively powerful bimetal thermostatic coil 1. At its inner end the coil 1 is anchored in effect to the cover 91, for removal and insertion therewith. Actually the mounting upon the cover is indirect, through a bracket member 10, which is slotted, as indicated at 11, for the reception of retaining screws 12, which permit the bracket to be shifted transversely of the casing 9 and generally in the plane of the lever 3. The inner end of the bimetal coil 1 is securely anchored at 14 to the bracket 10, hence when the bracket is shifted the coil 1 is likewise shifted, and this includes its projecting end 13. It follows that when this end 13 is shifted, the lever 3 is tilted, and by this tilting the valves are set relatively in a position which will predetermine a different mean temperature to be maintained.

Such shifting of the platform 10 and of the bimetal coil 1 must be accomplished from the exterior of the casing. The platform 10 is provided with a slot 15 (see Figure 3), in which is received a crank pin 50 upon a shaft 5 which extends substantially axially through the cover 91, and which is packed therein. Rotation of the shaft 5 is accomplished by means of a cap 51 secured to the end of the shaft by a screw 52, torque being transmitted from the cap to the shaft by means such as the square peg 53 received in a square socket in the end of the shaft and fitting within an internally serrated bore 54 in the cap; see Figure 4. This manner of interconnection permits the cap to be rotated by small angular increments relative to the shaft and to the casing, to match an index carried by the cap with a scale carried on the casing, or round about the casing, or vice versa, to indicate the temperature of mixture for which the valve is set, and to guide the user in resetting the device for a different temperature. Stops 95 on the casing (see Figure 3), and 59 on the cap, cooperate to limit the extent of adjustment possible.

Check valves 6 and strainers 60 might be incorporated in the casing 9, at the respective inlets 70 and 80, but preferably are formed as separate fittings mounted in the lines leading to these inlets.

As will be clear, the casing 9, with the cover 91, thermostatic coil 1, valves 27 and 28, and their mounting body 2, all removed, may be installed when the plumbing is roughed in, and thereafter the body 2, carrying the valves 27 and 28 and the lever 3, may be inserted as a unit from the open outer end of the casing. All these parts may be adjusted while removed from the casing, and when inserted are in operating condition. Indexing for correct orientation of the body 2 within its bore 23 is provided by the two screws 20 which hold the body 2 in place. Next the cover 91 is secured in place, and this carries the bimetal coil 1. In mounting the cover it is a simple matter to insert the end 13 of the bimetal coil within the slot 32, and this secures the bimetal element in operative relationship to the lever and valves. The cover is correctly oriented by the screws 92. If after engagement of the bimetal coil end 13 any adjustment for the mean temperature to be maintained is found necessary, this can be accomplished by adjusting the cap 51 relative to the shaft 5, before tightening the screw 52 in the shaft 5, to lock the cap in rotative engagement with the square peg 53. The mixing valve is then ready for operation. If at any future time it is desirable to inspect, clean, or adjust it, this can be readily accomplished by removal of the cap 51 and the cover 91, when all parts become accessible.

I claim as my invention:

1. A thermostatic mixing valve comprising a casing having an outlet, and having a hot water inlet and a cold water inlet, two valves, one to control the amount of water admitted from the hot water inlet and the other to control the amount of water admitted from the cold water inlet, a lever fulcrumed within the casing, and operatively connected by its opposite ends to the respective valves, to shift them relatively oppositely, said lever having also a third arm intermediate its ends, a bimetal coil anchored at one end within the casing, disposed in the general plane of said lever, and having its other end operatively engaged with the third arm of said lever, to tilt the lever in the sense to admit more cold water as the mixture's temperature increases, and vice versa, means guiding the anchorage of the bimetal coil for movement in a direction parallel to the length of said lever, and external means operatively connected to said anchorage, and rotatable about an axis generally parallel to said third arm, so to shift it, and thereby to vary the equilibrium temperature maintainable by the bimetal coil.

2. A thermostatic mixing valve comprising an elongated casing having an outlet, and having a hot water inlet and a cold water inlet, two valves, one to control the amount of water admitted from the hot water inlet and the other to control the amount of water admitted from the cold water inlet, a lever fulcrumed within the casing intermediate said valves, and operatively connected by its opposite ends to the respective valves, to shift them relatively oppositely, said lever having also a third arm intermediate its ends, a bracket within the casing guided for sliding movement generally in the plane of said lever, an eccentric rotatably mounted within the casing, in a plane transverse to said lever, and operatively connected to said bracket to shift it, a bimetal coil anchored at one end to said bracket, disposed in the general plane of the lever, and having its other end operatively engaged with the third arm of said lever, to tilt the latter in the sense to admit more cold water as the mixture's temperature increases, and vice versa, to maintain automatically a predetermined temperature of equilibrium, and external means to rotate said eccentric and thereby to shift the position of said bracket, and hence of the lever and valves, to vary the temperature of equilibrium.

3. A thermostatic mixing valve comprising an elongated casing having an outlet, and having a hot water inlet and a cold water inlet, a valve shiftable relative to each inlet to control the amount of water admitted from the respective inlets, a lever fulcrumed within the casing intermediate said inlets, and operatively connected by its opposite ends to the respective valves, to shift them relatively oppositely, said lever having also a third arm intermediate its ends, a bracket within the casing guided for sliding movement generally in the plane of said lever, a bimetal coil anchored at one end to said bracket, disposed in the general plane of the lever, and having its other end operatively engaged with the third arm of said lever, to tilt the latter in the sense to admit more cold water as the mixture's temperature increases, and vice versa, to maintain automatically a predetermined temperature of equilibrium, a rotative shaft extending through the casing and carrying a crank pin at its inner end, the bracket having a slot receiving said crank pin for shifting of the bracket, and hence of the lever and valves, upon rotation of said shaft, and an external handle upon said shaft, for rotation of the latter to vary the temperature of equilibrium.

4. A thermostatic mixing valve comprising a generally cylindrical casing open at one end, a cover closing such end, the casing having a single bore in its closed end to which lead laterally separate hot water and cold water inlets, and from which leads an outlet, a cylindrical body snugly and removably received in said bore, ported in its sides in registry with said inlets, and ported lengthwise in registry with said outlet, and having two oppositely disposed longitudinal bores communicating respectively with the hot and cold water inlet ports, a sleeve valve in each bore cooperating with the inlet ports of said body to control the amount of water admitted by the respective inlets, a lever fulcrumed upon and removable with said body intermediate the valves, and operatively connected by its opposite ends to the respective valves, to shift them oppositely, said lever having a third longitudinally slotted arm intermediate its valve-connected ends, and a bimetal coil anchored at one end upon the cover within the casing, and having its other end seated within the slot of the lever's third arm, and shiftable in the general plane of the lever, to tilt the latter in the sense to admit more cold water as the mixture's temperature increases, and vice versa.

5. A thermostatic mixing valve comprising a generally cylindrical casing open at one end, a removable cover closing such end, the casing having a single bore in its closed end to which lead laterally separate hot water and cold water inlets, and from which leads an outlet, a cylindrical body snugly and removably received in said bore, ported in its sides in registry with said inlets, and ported lengthwise in registry with said outlet, and having two oppositely disposed longitudinal bores communicating respectively with the hot and cold water inlet ports, a sleeve valve in each bore cooperating with the inlet ports of said body to control the amount of water admitted by the respective inlets, a lever fulcrumed upon and removable with said body intermediate the valves, and operatively connected by its opposite ends to the respective valves, to shift them oppositely, said lever having a third longitudinally slotted arm intermediate its valve-connected ends, a bracket guided upon the inner side of and removable with said cover for shifting lengthwise of the lever, a bimetal coil anchored at one end upon said bracket, its other end projecting towards and received within the slot of the lever's third arm, and shiftable, by thermostatic action or by shifting of the bracket, to tilt the lever in one sense or the other, the several parts being arranged to effect thermostatic movement of the lever in the sense to admit more cold water as the mixture's temperature increases, and vice versa, and means operable externally of the casing for shifting said bracket.

6. The combination of an elongated casing open at its outer end and closed at its inner end, and provided with fluid inlets at such inner ends, a valve for each of said inlets guided for movement in parallel paths, a pivoted lever within its inner end interconnecting said valves for relatively reverse movement, a thermostat in said casing coiled for rotary movement, and having a terminus traversable in the plane of such coil, the lever and said terminus being complementally formed to interfit directly, for tilting of the lever and corresponding operation of the valves in accordance with traversing movement of the thermostat's terminus, and a cover seated by movement lengthwise of the casing upon the outer end of said casing, the thermostat being mounted upon said cover, and its terminus and the lever being complementally formed to operatively interfit by the axial seating movement of the cover upon the casing.

7. The combination of claim 6, including a body wherein the valves are mounted, and whereon the lever is pivoted, the casing having a longitudinal bore opening to its interior, and to which lead the respective inlets, wherein said body is snugly received and thereby positioned for interfitting of the lever and thermostat terminus.

8. A thermostatic mixing valve comprising a casing of generally elongated shape closed at its inner end and open at its outer end, to define a mixing chamber, and having an axial bore within its closed end, opening only into its interior, a hot water inlet directed into said bore at one side of the casing, and a cold water inlet directed into the bore at the opposite side of the casing, an outlet leading from said bore intermediate the hot and cold water inlets, a cylindrical body removably received snugly within said bore and apertured for communication between said outlet and the mixing chamber, said body having two axially directed valve bores communicating respectively with the hot water inlet and with the cold water inlet, a sleeve valve slidable in each valve bore and cooperating therewith to regulate inflow, a three-armed lever pivotally mounted upon the outer end of said body, two opposite arms operatively engaging the two valves respectively, for mutually opposite operation upon tilting of the lever, and the third arm being directed outwardly, a cover removably seated and secured upon and closing the open outer end of the casing, and a thermostatic element mounted upon said cover, within the mixing chamber, and terminating in a longitudinally directed terminus movable relative to the casing in the general plane of the lever under the influence of temperature variations of the water in the mixing chamber, said terminus and the third arm of the lever being complementally formed for operative interengagement by relative axial movement in seating the cover upon the casing.

VERE C. MILLER.

REFERENCES CITED

The following references are of record in the file of this patent:

UNITED STATES PATENTS

| Number | Name | Date |
| --- | --- | --- |
| 1,153,547 | Finney | Sept. 14, 1915 |
| 1,476,718 | Leonard | Dec. 11, 1923 |
| 1,932,148 | Schneider | Oct. 24, 1933 |
| 1,989,909 | Boydston | Feb. 5, 1935 |
| 2,172,823 | Berks | Sept. 12, 1939 |
| 2,332,995 | Eaton | Oct. 26, 1943 |
| 2,356,816 | Breckenridge | Aug. 24, 1944 |
| 2,430,133 | Muffly | Nov. 4, 1947 |

FOREIGN PATENTS

| Number | Country | Date |
| --- | --- | --- |
| 430,856 | Germany | June 24, 1926 |